Aug. 23, 1960   R. M. DOWNEY ET AL   2,949,698
RESILIENT PERMANENT MULCH PAD
Filed July 23, 1958
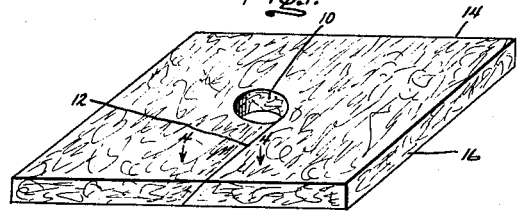
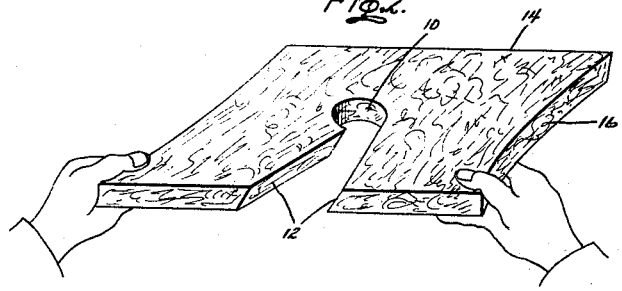
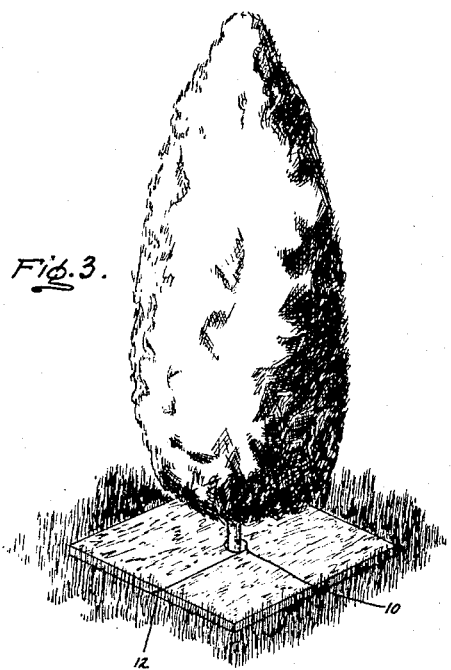
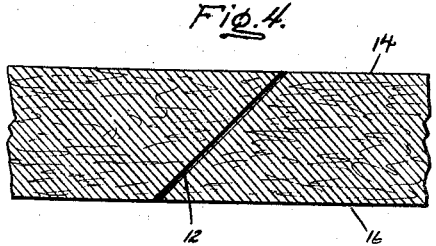
Inventors:
Richard M. Downey,
Edwin L. Jamison,
by Gust & Diish
Attorneys.

United States Patent Office 2,949,698
Patented Aug. 23, 1960

2,949,698

RESILIENT PERMANENT MULCH PAD

Richard M. Downey, Roann, and Edwin L. Jamison, Syracuse, Ind., assignor to Midwest Insulations, Inc., Wabash, Ind., a corporation of Indiana; Airseal Insulations, Inc., Buffalo, N.Y., a corporation of New York; and Carney Corporation, Mankato, Minn., a corporation of Minnesota, in equal shares Filed July 23, 1958, Ser. No. 750,383

3 Claims. (Cl. 47—9)

The present invention relates to mulch pads, and more particularly to mulch pads or articles formed of bonded mineral or glass fiber to provide a preformed, resilient, permanent mulching article.

From time immemorial, loose organic materials such as leaves, stalks, corn cobs, straw, sawdust, peat moss, etc., have been spread upon the ground around plants, trees and shrubs for the purposes of preventing the evaporation of moisture from the soil and to protect the roots from the extremes of heat and cold.

More recently, certain loose inorganic materials such as mineral fiber and expanded vermiculite have been suggested for use as mulching materials. Such inorganic mulches are of advantages by reason of their relative permanence and inert character in contrast to the organic mulches which are subject to rapid decay, plant and animal infestation, and ineffectiveness after a relatively short period of use. In addition to the relative permanency of the inorganic mulches, further advantage in the use thereof resides in the elimination of harmful chemical effects to the soil by reason of the relative inertness thereof.

Loose mulching materials, however, are difficult to measure and apply in connection with achieving optimum results by reason of the incoherent nature thereof. On the other hand, although sheet materials such as, e.g., aluminum foil, may be easier to apply than loose material by reason of its integral structure, its mulching value is questionable by reason of its dependence upon reflective insulating properties as well as the fact that such material constitutes a vapor barrier which prevents the absorption and retention of moisture, as well as preventing external fertilization or chemical feeding of the plant while it is in place.

Still further, loose mulching materials intermix with the soil to such an extent that they lose their identity and mulching value.

In view of the foregoing, it is an object of the present invention to provide an integral, preformed, resilient, permanent mulching article which may be applied to a growing plant or shrub with ease.

It is a further object of this invention to provide a mulching pad of bonded inorganic, fibrous substance fabricated as an integral, preformed, resilient mulching article exhibiting the desirable characteristics of permanency, resistance to decay, and permeability to moisture and fertilizing ingredients as well as sterility and inertness to plant or animal infestation.

It is another object of this invention to provide a mulching pad of bonded inorganic fibrous materials having a predetermined density so as to provide optimum thermal insulating characteristics which provides protection to the plant, tree or shrub from abnormal temperature variance as well as to inhibit the evaporation of moisture contained in the soil.

It is yet another object of this invention to provide an integral mulching pad which is permeable to moisture yet is permanent as to its structural characteristics so that it may be used over an extended period of time without loss of mulching value.

Other objects will appear as the description proceeds.

To the accomplishment of the above and related objects, our invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

Fig. 1 is an isometric view of a mulching pad of this invention;

Fig. 2 is an isometric illustration of the mulching pad of Fig. 1 spread open for application to a plant;

Fig. 3 is a similar illustration of a mulching pad applied to a shrub or the like; and Fig. 4 is a fragmentary cross-sectional view of our mulching pad taken along the line 4—4 of Fig. 1.

Referring to the drawings, the mulching pad of this invention comprises an integrated structure of, for example, two to three inches in thickness and width and length dimensions of from one to three feet, as may be desired for a given application. As shown, the pad is square and is provided with a central opening 10 and an oblique slot 12 which extends from the opening 10 through one pad edge.

The material forming the pad is essentially fibrous and more particularly composed of inorganic, elongated fibers of from eight to fifteen (8 to 15) microns in diameter and from one to five (1 to 5) inches in length, these dimensions not being critical but conforming to those normally obtained in such typical fibrous material. These fibers are essentially the same as those comprising the well-known glass or mineral wool commonly used as insulation material in houses, ovens, refrigerators and the like, and may be produced according to any of the well-known methods, such as that of Downey application Serial No. 504,944, filed April 29, 1955 and entitled "Method and Apparatus for Forming Mineral Fibers and the Like"; now Patent No. 2,882,552, issued April 21, 1959.

A typical composition of such fibrous material is as follows:

| | Percent |
|---|---|
| $SiO_2$ | 37 |
| $Al_2O_3$ | 12 |
| CaO | 42 |
| MgO | 7 |
| Trace elements | 2 |

Fibrous material of such a composition is characterized by the fact that it is relatively permanent and inert.

The fibers of this material are coated with a suitable bonding agent, such as, e.g., phenol-formaldehyde, and this bonding agent is cured or set by means of heat while the coated fibers are assembled together in an article of specific dimensions, thereby resulting in a pad or blanket. Such a pad or blanket exhibits a high degree of resilience which permits it to be compressed or flexed, thereafter returning to its original shape or dimensions. In the formation of the uncured pad, coated fibers are spread over an extended area, this process continuing until the fibers have achieved a desired thickness, the fibers extending in random directions and contacting each other at various points along the lengths thereof. These fibers are thus loosely assembled or collected, thereby providing insulating voids or spaces therebetween as well as achieving a moisture permeable structure. In this connection, a typical pad as illustrated in the drawings has a density of, say, two pounds of fibrous material per cubic foot. The bonding agent is now cured by the application of heat in the case of phenol-formaldehyde. During curing, two substantially parallel mold plates, usually two foraminous conveyors, spaced apart the desired thickness of the finished pad, have the assembled fibers contained therebetween so that when the curing has been completed, the pad or blanket will have a preformed or set thickness.

With the fibrous material so bound together, following the curing of a bonding agent, the resulting preformed pad or blanket is both permanent and resilient. The pad or blanket is then cut by means of a knife or saw to the desired length and width, the central opening 10 being cut through by means of a circular coring tool and the oblique slot 12 being cut by means of a knife or saw.

With the pad formed as shown in Fig. 1, it may be flexed or sprung apart, as shown in Fig. 2, and fitted around the trunk of a shrub or plant, as shown in Fig. 3, the natural resilience in the pad causing the sides to spring together until the oblique slot 12 is closed, as shown. With the provision of the oblique slot 12, the natural resiliency of the pad provides, in closing, an overlap or seal which is further enhanced by reason of the natural cohesion of the fibrous materials. This results in complete enclosure and coverage of a given area circumscribing the plant, which area is coextensive with the root system of the plant. Preferably, the plane of the slot 12 intersects the pad surfaces 14 and 16 at an angle of forty-five degrees (45°).

In use, and with the pad applied as shown in Fig. 3, the plant may be watered the same as if the pad were not present, the water merely permeating the pad and soaking into the soil beneath. During periods of drought, the capillary action of the fibrous materials serves to draw moisture forming as early morning dew into the pad, thence to the soil beneath, with the insulating effect of the pad serving to inhibit the evaporation of moisture therefrom; hence the soil in the area of the principal root system is kept moist over extended periods of time. Also, fertilizers may be spread over the pad and allowed to leach through under the influence of repeated waterings or rain showers.

The opposite surfaces 14 and 16 of the pad are preferably formed substantially parallel in order to obtain uniform mulching action over the entire area covered by the pad. The pad may be made in relatively large sizes to cover an area occupied by several such plants, such a large pad being provided with a corresponding number of openings 10 and oblique slits 12 to enable applying the pad to all of the plants.

What is claimed is:

1. A resilient permanent mulching article comprising a fabricated pad of mineral wool fibers assembled together in predetermined relation to provide air spaces between fibers, the material of said fibers being stable and inert, said fibers being coated with a phenol-formaldehyde bonding agent, said fibers being bonded together into a resilient, blanket-like integrated pad having two opposite surfaces which are substantially parallel, said pad being permeable to water, said pad having an opening therethrough between the peripheral edges thereof, said pad further having an oblique slit therethrough extending from one of said edges to said opening.

2. A resilient permanent mulching article comprising a fabricated pad of resilient mineral wool fibers assembled together in predetermined relation to provide air spaces between fibers, the material of said fibers being stable and inert and insoluble in soil which supports plant life, said fibers being bonded together into a relatively soft, resiliently compressible blanket-like pad having a given uncompressed thickness and two opposite substantially parallel surfaces, said fibers being further spaced in said pad to provide a water-permeable construction and thermal-insulating properties, said pad having an opening in the central portion thereof between the peripheral edges thereof, said pad further having an oblique slit therethrough extending from said opening through one of said edges.

3. A resilient permanent mulching article comprising a fabricated pad of resilient mineral wool fibers assembled together in predetermined relation to provide air spaces between fibers, the material of said fibers consisting of substantial percentages of silicon dioxide, aluminum oxide, calcium oxide, and magnesium oxide to the exclusion of soluble constituents and being inert and insoluble in soil which supports plant life, said fibers being elongated from eight to fifteen microns in diameter and one to five inches in length, said fibers being bonded together into a relatively soft, resiliently compressible blanket-like pad having a given uncompressed thickness and two opposite substantially parallel surfaces, said fibers being of predetermined density in said pad to provide a water-permeable construction and thermal-insulating properties, said pad having an opening in the central portion thereof between the peripheral edges thereof, said pad further having an oblique slit therethrough extending from said opening through one of said edges.

References Cited in the file of this patent

UNITED STATES PATENTS

| 2,192,939 | Slayter | Mar. 12, 1940 |
| 2,842,897 | Finn | July 15, 1958 |

FOREIGN PATENTS

| 112,662 | Great Britain | Jan. 18, 1918 |
| 769,878 | Great Britain | Mar. 13, 1957 |